United States Patent [19]

Pisecky

[11] Patent Number: 4,979,313

[45] Date of Patent: Dec. 25, 1990

[54] PROCESS FOR COOLING HYGROSCOPIC POWDER

[75] Inventor: Jan Pisecky, Taastrup, Denmark

[73] Assignee: A/S Niro Atomizer, Gladsaxevej, Denmark

[21] Appl. No.: 468,478

[22] Filed: Jan. 12, 1990

[30] Foreign Application Priority Data

Jan. 20, 1989 [DK] Denmark .............................. 249/88

[51] Int. Cl.$^5$ ............................................. F26B 3/08
[52] U.S. Cl. .......................................... 34/10; 34/13; 34/57 A; 34/85; 34/20
[58] Field of Search ............ 34/20, 57 R, 57 A, 57 B, 34/85, 10, 32, 13

[56] References Cited

U.S. PATENT DOCUMENTS

| | | | |
|---|---|---|---|
| 3,667,133 | 6/1972 | Lincoln | 34/20 |
| 4,190,963 | 3/1980 | Christensen et al. | 34/85 X |
| 4,457,081 | 7/1984 | Von Wedel | 34/20 |

Primary Examiner—Henry A. Bennet
Attorney, Agent, or Firm—Armstrong, Nikaido, Marmelstein, Kubovcik & Murray

[57] ABSTRACT

Hygroscopic powders, especially fat-containing milk products, are cooled by being fluidized in cooling air. Dehumidification of the drying air is omitted and overdrying prior to cooling to compensate powder rehumidification during cooling is avoided by using a closed cycle cooling in which the spent cooling air after efficient dust removal and re-cooling is used as cooling and fluidizing air. Substantial energy savings are achieved while product quality is maintained or improved.

10 Claims, 4 Drawing Sheets

PROCESS FOR COOLING HYGROSCOPIC POWDER

FIELD OF THE INVENTION

The present invention relates to cooling of powders and more specifically to the cooling of hygroscopic powders to temperatures at which the powder would absorb moisture if contacted with ambient air.

Powdery products produced by for example drying, coating, agglomerating or milling processes, are often recovered so warm or hot that it is necessary or desirable to cool them before storage, packing or further processing thereof.

Thus, for example various food products such as milk powders, fat filled milk powders, soup powders, sugar etc. are usually subjected to a cooling treatment when spontaneous cooling would proceed so slowly that a deterioration of the product quality would be expected.

Also inorganic ammonium compounds or other agrochemicals which are hygroscopic in themselves or are contaminded with hygroscopic substances are often subjected to a cooling after the manufacturing thereof.

DESCRIPTION OF PRIOR ART

Cooling of powdery products requires an efficient heat exchange between the powder particles and the cooling medium. This requirement is fulfilled by cooling processes in which the warm powder is fluidized in a stream of cooling air (in the present specification termed fluidized bed cooling), and cooling processes utilizing this principle have achieved widespread application especially as an aftertreatment of powders resulting from a drying or coating process.

However, fluidized bed cooling involves certain problems when the powder to be cooled is hygroscopic. When for example a spray dried milk powder has to be cooled to 20° C. or less from the temperature at which it is obtained from a preliminary cooling or lecithin-treatment step, it is conventional to reduce the moisture content of ambient air before using it as cooling and fluidizing air. This reduction of moisture content is achieved by an energy consuming cooling of said air to condense a part of the water vapor therein, after which a certain reheating of the air is required before it is contacted with the powder.

Even when this cooling air conditioning measure is adopted the powder will absorb a substantial amount of moisture. This means that the powder before cooling must be dried to a moisture content lower than the one required for the end product. Therefore, a so-called overdrying must precede the cooling. This overdrying increases heat consumption, reduces the capacity of the drying equipment and may, for certain sensitive materials, impair product quality.

Thus, there is a need for a process for cooling of a hygroscopic powder which does not require a moisture removing conditioning of large amounts of cooling air and which does not involve an increase of the moisture content of the powder during the cooling process.

SUMMARY OF THE INVENTION

It has now turned out that a fluidized bed cooling of hygroscopic powders may be performed without increasing the moisture content of the powder, and thus without necessity of a preceding overdrying of the powder, and that any energy consuming moisture removing conditioning of the cooling air may be omitted if the cooling process is performed as described below.

The invention, therefore, deals with a process for cooling hygroscopic powders to a desired temperature at which the powder would absorb moisture if above said fluidized layer and the entrained particles are separated from said gas stream, the hygroscopic powder is withdrawn from the fluidized layer at a location at a distance from the site where it is introduced into the fluidized layer, said powder having said desired temperature and a desired moisture content, which process is characterized in that (i) the powder is introduced into the fluidized layer while having a moisture content as that desired for the powder after cooling, (ii) the stream of gas withdrawn from above the fluidized layer and from which entrained particles have been separated, is recycled and used for fluidizing the powder to be cooled and (iii) the circulating stream of gas is cooled at one or more locations selected among locations in the fluidized layer and outside said layer.

The gas referred to above may be air, but if the powder to be cooled is liable to undergo undesired oxidation, nitrogen or any other inert gas may be used. However, for the sake of simplicity, in the following said gas is referred to as air.

The process has been developed i.a. with a view to cool spray dried whole milk powder or baby-food or fat filled milk powder which in a prior processing step has been cooled to a temperature of approximately 40° C. by fluidized bed cooling using ambient air. The process is of particular interest for baby-food and fat filled milk powders since for these products a quick cooling is regarded as important to maintain product quality. However, the process may, in principle, be applicable and advantageous for cooling of any hygroscopic powder which would absorb moisture if cooled to the required temperature in a stream of non-dehumidified ambient air. A substantial interest exists in the utilization of the process for the cooling of sugar and scopic powder which would absorb moisture if cooled to the required temperature in a stream of non-dehumidified ambient air. A substantial interest exists in the utilization of the process for the cooling of sugar and fertilizers containing ammonium nitrate or other hygroscopic ammonium salts.

In food preservation technology the parameter termed "water activity" is of major importance. The water activity of a powder at a certain moisture content and at a certain temperature is defined as the relative humidity of air being in equilibrium with the powder. It means that if the powder comes into contact with air of higher relative humidity than its water activity it will pick up moisture from the air whereas powder contacted with air of lower relative humidity than its water activity liberates moisture to the air. For a further explanation of the term water activity reference is made to: "Water Activity: Influences on Food Quality" edited by L. B. Rockland and G. F. Stewart, Academic Press, 1981.

There is a direct correlation between the water activity of a food product such as milk powder and essential food deterioration processes such as microbial growth, enzyme activity, hydrolytic reactions, non-enzymic browning reactions and lipid oxidation.

While the importance of the water content for food deterioration varies substantially dependent on the specific food products, the water activity in this respect is a more universally applicable characteristic than the moisture content.

Due to the content of amorphous lactose milk powders are very hygroscopic, and consequently the acceptable water activity corresponds to a rather low moisture content.

In a contribution by Jan Pisecky in Concentration and Drying of Foods, Elsevier Applied Science Publishers (1986), p. 214-215 it is graphically illustrated how water activity of skim milk powder is a function of moisture at three different temperatures.

In whole milk powder and other fat-containing milk powders the relationship between water activity and moisture is the same, provided that the moisture content is calculated on the non-fat fraction only. The fat fraction may in this connection be regarded as inert. Based on this consideration graphs have been calculated for water activity of whole milk powder as a function of moisture at three different temperatures. Said graphs appear from FIG. 1 which has been experimentally verified.

The final moisture content of whole milk powder, baby food and similar products is often required to be maximum 2.5% or even lower, and the final temperature before packing maximum 20° C.

From FIG. 1 it appears that the water activity of whole milk powder having a moisture content of 2.5% at the temperatures 20°, 30° and 40° C. are as indicated in Table I below, which also indicates the values for absolute humidity of the air which is in equilibrium with the powder and dew points of the air.

TABLE 1

| Temp. °C. | Water activity | Abs. humidity of the air g/kg | Dew Point of the air °C. |
|---|---|---|---|
| 20 | 0.143 | 2.1 | −8.03 |
| 30 | 0.160 | 4.3 | 1.45 |
| 40 | 0.175 | 8.2 | 10.75 |

From Table I it can be seen that if, for instance, whole milk powder is cooled by air having 8.2 g/kg humidity it will start to pick up moisture from the cooling air already when it is cooled to a temperature lower than 40° C. If the milk powder having a moisture content of 2.5% shall be cooled to 20° C. without any increase in moisture content a cooling air of an absolute humidity of 2.1 g/kg or less will be required.

In most of the inhabited part of the world the humidity of the air is usually substantially above said value. Thus, the distribution of air humidities throughout the year in most continental European countries is as follows:

| 2-5 g/kg | Winter time | 20% a year |
|---|---|---|
| 5-8 g/kg | Spring and autumn | 60% a year |
| 8-14 g/kg | Summer time | 15% a year |
| 14-20 g/kg | Humid period in summer time | 5% a year. |

In tropical climate the absolute air humidity most of the year is above 18 g/kg.

Thus, an energy consuming dehumidification and reheating is usually necessary even when the above described preceding over-drying of the product is applied.

The hygroscopic character of the products in question also appears from the fact that air which has been dehumidified before introduction into the powder cooler and which during the powder cooling process has been heated to 20° C. will have a relative humidity of 48%, and milk powder in equilibrium therewith at the same temperature will have a moisture content of 8%.

Thus, the prior art processes require a substantial overdrying of such milk products and dehumidification of the cooling air to obtain the cooled powder with the desired final moisture content of 2,5%.

Therefore, the process of the invention provides substantial advantages over the prior art processes, especially in connection with said hygroscopic milk products.

As mentioned above the particles which are entrained in the stream of air withdrawn from above the fluidized powder layer should be collected before the stream of air is cooled again and recycled to the powder cooling step, since otherwise there is a risk that powder deposits may cause operational problems.

Therefore, it is preferred to separate said entrained particles by passing the stream of air through a cyclone and subsequently through a bag filter.

The particles separated out in the cyclone and in the bag filter may be added to the cooled product recovered from the fluidized layer.

In a typical embodiment of the process according to the invention for cooling a spray dried powdery milk product from a temperature of 35°-50° C. to a temperature below 28° C. the following steps are included:

(a) introducing the powdery milk product at a moisture content of 2-3% in one end of a fluidized layer of said powdery product maintained in a stream of cooling air, (b) withdrawing the stream of cooling air and particles entrained therein from above said fluidized layer and separating the entrained particles from said stream, (c) cooling the stream of air from step (b) to a temperature below 20° C., (d) recycling the air cooled in step (c) as cooling air in step (a), and (e) withdrawing the powdery milk product at a temperature below 28° C., said milk product having a moisture content between 2 and 3%, from the end of the fluidized layer opposite the one at which said product is introduced in step (a).

DESCRIPTION OF PREFERRED EMBODIMENTS

Figure 1:
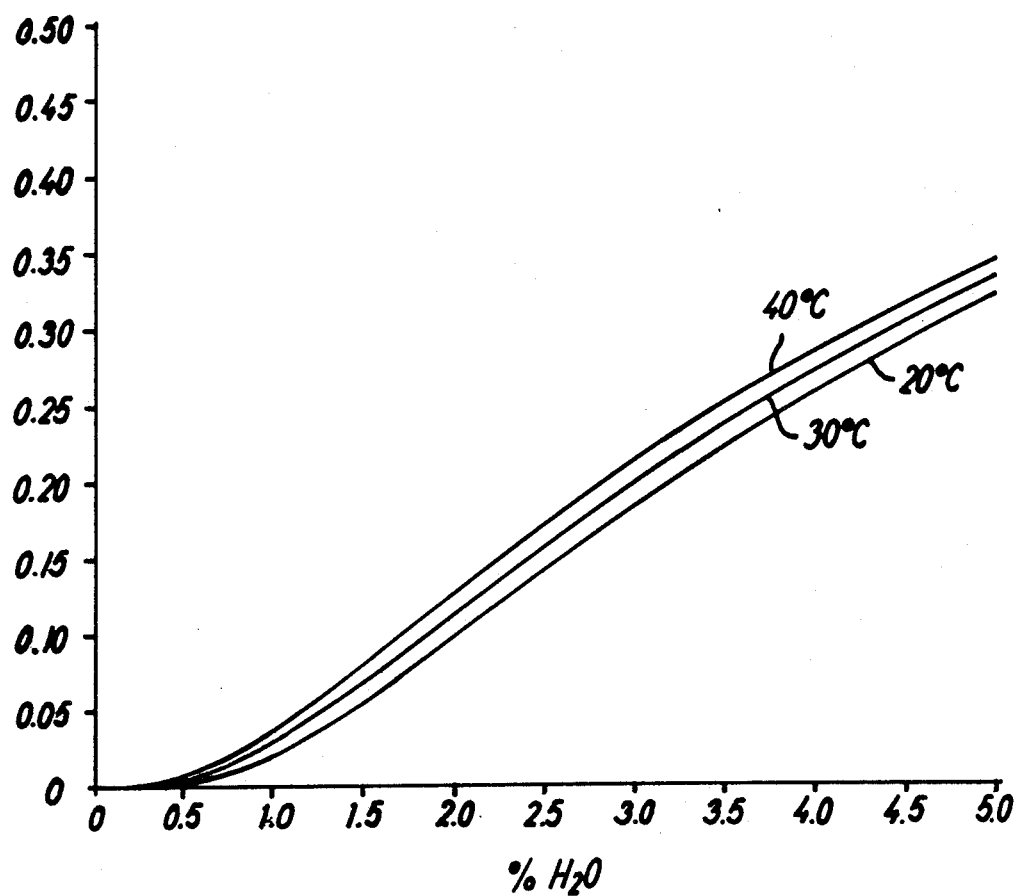
Figure 2:
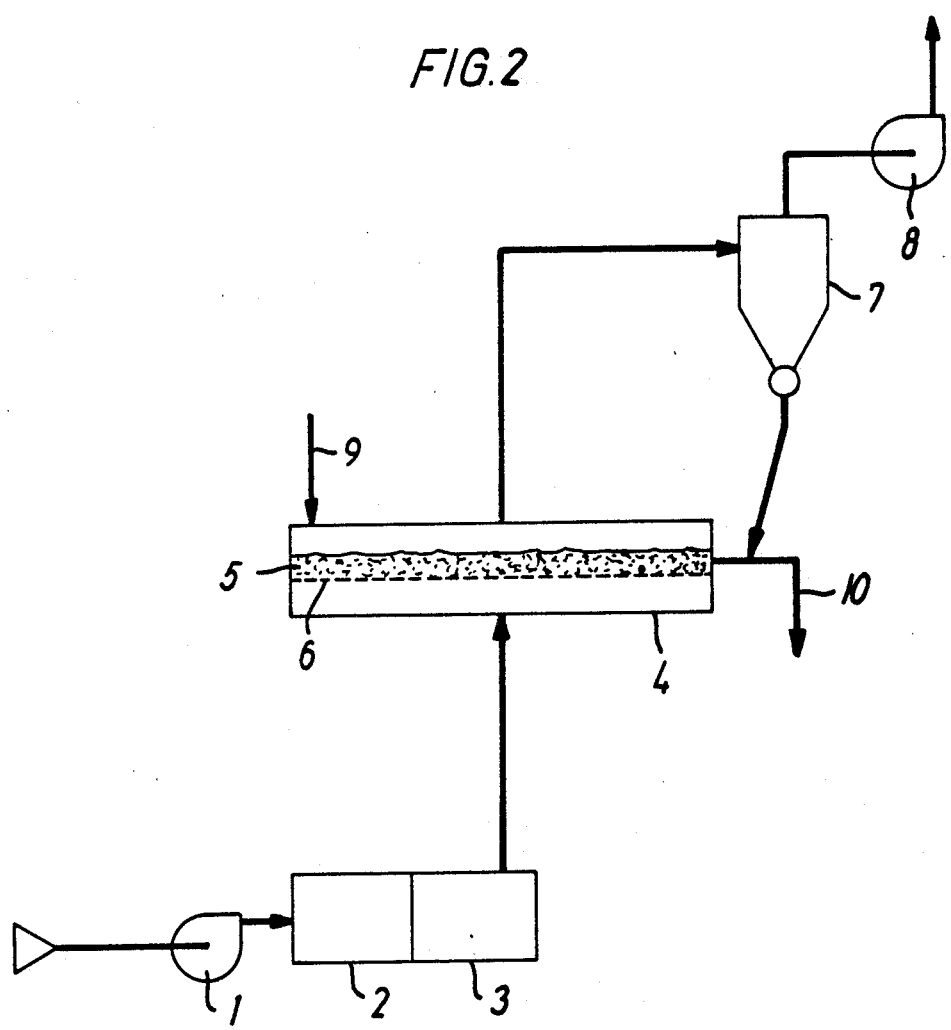
Figure 3:
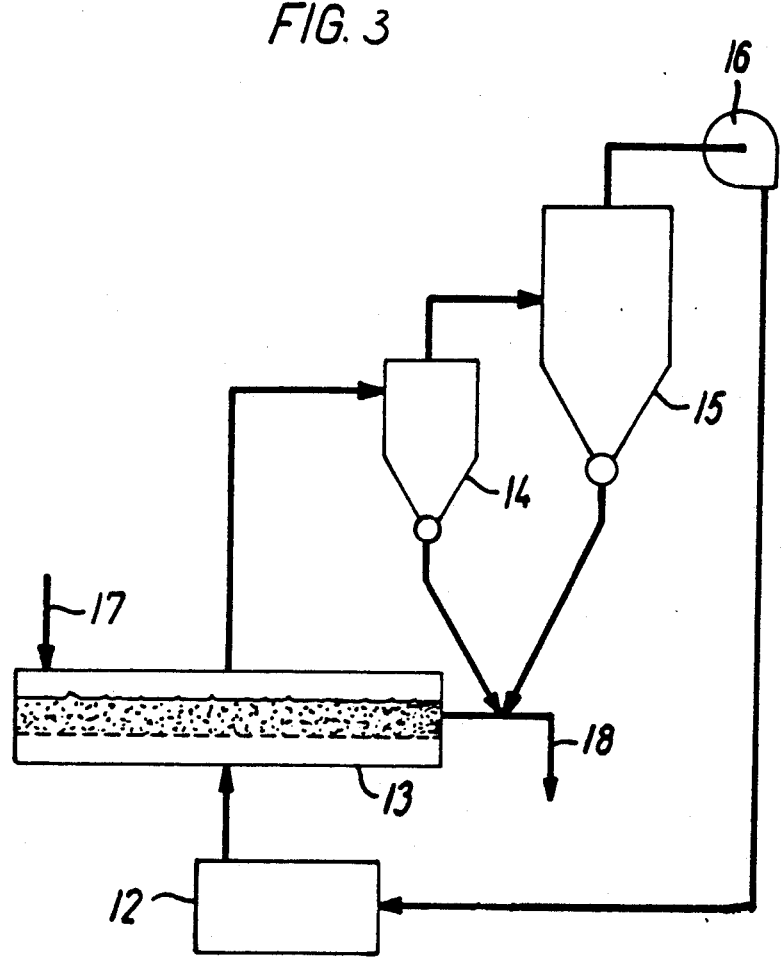
Figure 4:
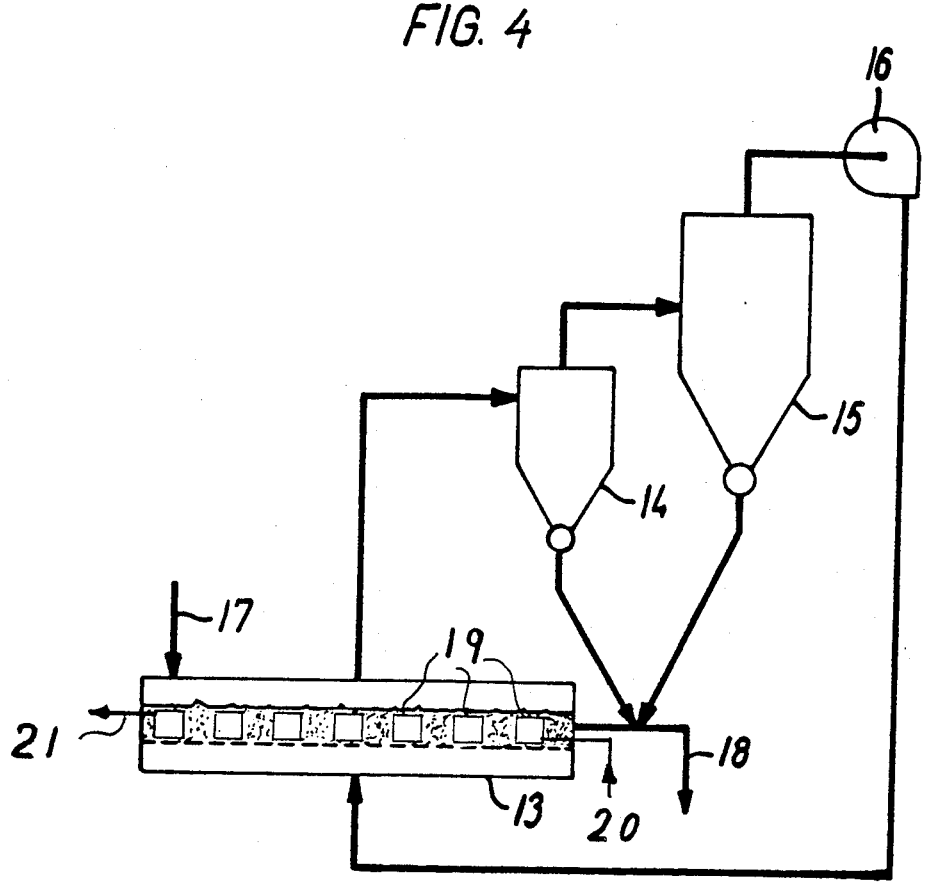

The process according to the invention will be explained in more detail with reference to FIG. 2, 3 and 4 of the drawing in which FIG. 2 is a schematic representation of a typical plant used in conventional fluidized bed cooling of milk powder, FIG. 3 schematically depicts a plant suitable for performing an embodiment of the process according to the present invention, and FIG. 4 schematically depicts an other embodiment of a plant suitable for performing the process according to the invention.

Referring to the schematic representation relating to a conventional process in FIG. 2, a fan 1 blows ambient air through a cooling device 2 wherein said air is cooled to condensate a part of the water vapor therein. The amount of water vapor which has to be condensated depends for example on the product to be cooled and on the moisture content of the ambient air which, of course, is subjected to considerable seasonal variations. As it is well known, condensation of water vapor is a rather energy consuming process.

From the cooling device 2 the air reaches a re-heater 3. A certain re-heating of the air is necessary prior to its contact with the hygroscopic powder to avoid an excessive increase of the moisture content of the powder, and to eliminate the risk of condensation of vapor on the internal surfaces of the equipment.

From the re-heater 3 the air is conducted to a fluidized bed cooler 4, known per se. Said fluidized bed cooler may be vibrated (by means not shown). When milk powders are cooled it is preferred to use such a vibrated fluidized bed, in which a relative thin fluidized layer is maintained. In the cooler a fluidized layer 5 of the powder to be cooled is maintained, supported by a perforated plate 6. The cooling air from the re-heater 3 passes through the perforations of the plate 6 and through the fluidized powder layer 5, whereupon it is let to a cyclone 7 in which a substantial part of entrained particles is separated. The stream of air leaving the cyclone is discharged through a fan 8.

The powder to be cooled is introduced at one end of the fluidized bed cooler 4, as indicated by conduit 9, and is withdrawn from the other end through conduit 10.

To compensate for absorption of moisture during the passage through the fluidized layer 5, the powder which is introduced through conduit 9 must be substantially dryer than desired for the cooled powder withdrawn through conduit 10. Therefore the powder must be subjected to a certain overdrying before introduction through 9. The disadvantages of such an overdrying is explained above.

The fluidized bed cooler may be provided with heat transfer panels (not shown) in the fluidized powder layer as those depicted in FIG. 4 and described in connection with that figure below.

The improvements obtained by the process according to the invention appear from the embodiments shown in FIG. 3 and 4.

In FIG. 3 a stream of recycled air is provided to a cooler 12 in which the air is cooled to a temperature somewhat below the one desired for the powder. In contrast to the conventional embodiment as depicted in FIG. 2, no conditioning by condensation of water vapor and reheating is required.

From the air cooler 12 the air enters the fluidized bed cooler 13 wherein it passes through a fluidized layer of the powder to be cooled. The fluid bed cooler 13 may suitably be a vibrated fluidized bed apparatus known per se, especially in connection with the treatment of milk products.

From the fluidized bed cooler the air passes to a cyclone 14 in which a substantial part of the particles entrained in the gas is collected while the remaining portion of entrained particles are removed in a bag filter 15 through which the stream of air is drawn by means of a fan 16. From the fan 16 the stream of air is recycled to the cooler 12. Thus the drying air is conducted in a closed cycle and no humidity is introduced into the system from the ambient air.

The powder to be cooled is introduced into the fluidized bed cooler 13 through conduit 17 and withdrawn through conduit 18. Due to the fact that no change in moisture content of the powder takes place during the passage of the powder through the cooler 13, the powder is introduced through conduit 17 at a moisture content substantially as the one desired in the cooled product withdrawn through conduit 18. Therefore, no overdrying of the powder is required before the introduction thereof through conduit 17.

The powder particles separated in the cyclone 14 and in the bag filter 15 are sufficient cool for being added directly to the powder withdrawn from the fluidized bed cooler through conduit 18.

The efficient removal of entrained particles before recycling the air stream leaving the fluidized bed cooler 13, requires the use of a bag filter 15 or similar efficient dust removing equipment.

To overcome the pressure drop over the bag filter 15 the fan 16 has to be more powerful and thus energy consuming than the corresponding fan 8 in the conventional process shown in FIG. 2.

However, this extra energy consumption of the fan 16 is more than compensated by the energy savings which are obtained because no water condensation has to be made for conditioning the cooling air and because no overdrying of the powder to be cooled has to be performed in a preceding drying step (not shown).

In the embodiment shown in FIG. 4 the fluidized bed cooler 13 is provided with heat transfer panels 19 located in the fluidized layer. The heat transfer panels 19 are mutually connected (not shown), and cooling medium, for example cold water is introduced through conduit 20 and withdrawn through conduit 21. In a preferred embodiment the heat transfer panels act as or are combined with guiding walls to obtain a plug flow pattern of the powder in the fluidized layer, countercurrent to the flow of cooling medium in said panels.

Application of heat transfer panels in a fluidized bed apparatus is well known per se and Examples on various embodiments thereof may be found in U.S. patent specification No. 3 771 237 (A/S NIRO ATOMIZER).

Usually such heating panels have been used to provide energy in heating and drying operations.

On FIG. 4 the numbers 14–18 have the same significance as indicated in connection with FIG. 3.

In the embodiment of FIG. 4 the heat transfer panels 19 are the only means for withdrawing heat from the powder and from the circulating gas. However, heat transfer panels as shown in FIG. 4 may obviously be used in combination with the gas cooler 12 shown in FIG. 3.

The use of heat transfer panels in the fluidized layer as partial or complete substitute for gas cooling in 12 enables saving of energy and is especially preferred in large stationary fluidized beds having a high fluidized layer for cooling for example sugar or fertilizers.

The invention is further illustrated by means of the following Examples which include comparison examples and embodiment examples showing the practice and advantageous features of the present process.

EXAMPLES 1 and 2 and

Comparison Examples 1 and 2

In these examples and comparison examples the starting material was whole milk powder at 40° C. obtained by single stage spray drying. At this temperature there is no risk that the powder absorbs moisture from ambient air. A vibrated 10 m$^2$ fluidized bed apparatus was used as powder cooler, and the product was treated at a rate of 3500 kg/h.

COMPARISON EXAMPLES 1 and 2

The cooling was performed using the process schematically depicted in FIG. 2. Ambient air was dehumidified to 7 g/kg moisture contents by cooling to 8.6° C. in device 2 and subsequently re-heated to 15° C. in reheater 3.

In Comparison Example 1 the whole milk powder when introduced through conduit 9 had a moisture content of 2.5% and when withdrawn through conduit 10 at a temperature of 24.7° C. the moisture content had increased to 3.27%. Such high moisture content is normally commercially unacceptable for whole milk powder.

These results demonstrate the non-acceptable pick-up of moisture even when a rather extensive dehumidification of the drying air has taken place.

In Comparison Example 2 the whole milk powder was subjected to an over-drying down to 1.5% moisture content to obtain a final temperature of 25.8% and a moisture content of 2.53%. Further details appear from Table 2 below.

EXAMPLES 1 and 2

The Examples 1 and 2 were preformed using the process according to the invention as illustrated in FIG. 3.

The essential parameters and results appear from the following Table 2.

TABLE 2

|  | Comparison Example 1 | Comparison Example 2 | Example 1 | Example 2 |
|---|---|---|---|---|
| Powder moisture-in | 2.5% | 1.5% | 2.5% | 2.5% |
| Powder temp.-out °C. | 24.7 | 25.8 | 25.4 | 20.2 |
| Powder moisture-out | 3.27% | 2.53% | 2.49% | 2.50% |
| Air temp.-in, °C. | 15 | 15 | 21.5 | 15 |

In the above Table the temperatures in the last line refer to the temperature of the air when it is introduced into the fluidized bed cooler 4 and 13, resp.

When ambient air temperature is 25° C. and the moisture content 14.0 g/kg the total energy requirement for the conditioning of the air used in Comparison Examples 1 and 2 is 115.4 kWh, whereas the energy required for cooling the air in Example 1 (in the cooler 12) is only 31.4 kWh. To this last mentioned energy consumption should be added 18 kWh due to the additional energy required to overcome the pressure drop in the bag filter 15. However, the energy consumption in Example 1 is still half of the energy requirement in Comparison Example 2.

Besides, the more extensive drying (over-drying) of the powder used as starting material in Comparison Example 2 has required an extra steam consumption of 436 kg/h in the preceding drying process.

The energy consumption in the conventional process as illustrated in Comparison Example 2 is obviously dependent on the temperature and humidity of the ambient air. The superiority of the present process over this conventional process is most convincing when ambient air is relatively warm and humid, but the process according to the invention is advantageous not only in areas with humid (tropical) climate but also in areas with more moderate climate, as explained above.

Example 3 and Comparison Examples 3 and 4

In Example 3 and Comparison Examples 3 and 4 the starting material was sugar (saccharose).

Both Comparison Examples and Example 3 were performed using a stationary fluidized bed cooler having heat transfer panels as the one shown in FIG. 4. The area of the fluidized bed was 6.40 $m^2$ and the height of the fluidized layer was 1.2 m. The amount of sugar treated in the Example and in each Comparison Example was approximately 40 t per hour. Before being used as starting material in Example 3 and Comparison Examples 3 and 4 the sugar was cooled to 39° C. by conventional means.

Comparison Example 3

The cooling was performed using a process without recirculation of the cooling gas, viz. using a flow as illustrated in FIG. 2 but with the dehumidification unit 2 and reheater 3 replaced by a cooler cooling ambient air to a temperature near but not below the dew point. As explained above the fluidized bed apparatus was provided with heat transfer panels through which was passed water at an average temperature of 17° C.

The results appear from Table 3.

Comparison Example 4

The operating conditions corresponded to those of Comparison Example 3 apart from the fact that the air had been dehumidified and reheated before being introduced in the fluidized bed cooler. Also here the average temperature of the cooling water passed through the heat transfer panels was 17° C. Further operational conditions appear from Table 3.

Example 3

This Example corresponds to the embodiment depicted in FIG. 4 which means that the gas was circulated in closed cycle and no cooling of the gas took place exterior of the fluidized bed cooler which means that all heat was withdrawn through the heat transfer panels 19. The average temperature of the water passing through the panels was 10° C.

The results appear from Table 3 below.

TABLE 3

|  | Comparison Example 3 | Comparison Example 4 | Example 3 |
|---|---|---|---|
| Powder moisture-in | 0.020% | 0.020% | 0.020% |
| Powder temp.-out | 24.7° C. | 24.6° C. | 25.1° C. |
| Powder moisture-out | 0.032% | 0.018% | 0.018% |
| Air temp.-in, | 10° C. | 10° C. | 33° C. |
| Air moisture-in | 7 g/kg | 2.4 g/kg | 2.4 g/kg |
| Air dewpoint-in | 8° C. | −5.1° C. | −5.1° C. |

The increase of moisture in the powder during Comparison Example 3 will usually not be acceptable, whereas the moisture content remains substantially unchanged in Comparison Example 4 and in Example 3.

However, in Comparison Example 4 this result is only obtained by using a substantial amount of energy for dehumidification and cooling of the stream of gas before reintroduction thereof into the fluidized bed cooler. Since the amount of ambient air which had to be cooled from 20° C. to 10° C. and dehumidified from 7.0 g $H_2O$/kg to 2.4 g $H_2O$/kg was 16850 kg/h, the energy consumption for that purpose was 109 000 kcal. Said heat consumption is far greater than the energy consumption for satisfying the requirements to the increased cooling capacity of the heat transfer panels 19.

I claim:

1. A process for cooling hygroscopic powder down to temperatures at which the powder would absorb moisture if contacted with ambient air, comprising the steps of
   (a) maintaining a fluidized layer of powder to be cooled in a stream of cooling gas and introducing into said layer the powder at a moisture content as that desired for the powder after cooling,
   (b) withdrawing the stream of cooling gas and particles entrained therein from above said fluidized layer and separating the entrained particles from said stream,
   (c) recycling the stream of gas as cooling and fluidizing gas in step (a),
   (d) cooling the stream of gas at locations selected from locations inside and locations outside the fluidized layer,
   (e) withdrawing the hygroscopic powder from the fluidized layer at a location at a distance from the place where it is introduced into the fluidized layer, the powder having the desired temperature and moisture content.

2. The process of claim 1 comprising cooling the stream of gas withdrawn from above the fluidized layer and from which entrained particles have been separated, to a temperature below the one desired for the powder and recycling the cooled stream of gas for use as cooling gas by which the powder to be cooled is fluidized.

3. The process of claim 1, comprising performing the cooling at least partially by means of heat transfer panels located in the fluidized layer.

4. The process of claim 1, comprising separating the entrained particles in step (b) by passing the stream of gas through a cyclon and subsequently through a bag filter.

5. The process of claim 1, comprising cooling of spray dryed whole milk powder or baby-food or fat filled milk powder which powder has previously been cooled at a temperature of approximately 40° C. by fluidized bed cooling using ambient air.

6. The process of claim 5, comprising introducing the powder into and withdrawing it from the fluidized layer while having a moisture content of 2-3% by weight.

7. The process of claim 5 comprising withdrawing the powder from the fluidized layer at a temperature of 15°-25° C.

8. The process of claim 1 comprising maintaining the fluidized layer of powder to be cooled in a vibrated fluidized bed apparatus.

9. A process for the cooling of a spray dried powdery milk product from a temperature of 35°-50° C. to a temperature below 28° C. comprising the steps of
   (a) introducing the powdery milk product at a moisture content of 2-3 at one end of a fluidized layer of said powdery product maintained in a stream of cooling air,
   (b) withdrawing the stream of cooling air and particles entrained therein from the top of said fluidized layer and separating the entrained particles from said stream,
   (c) cooling the stream of air from step (b) to a temperature below 20° C.,
   (d) recycling the air cooled in step (c) as cooling air in step (a), and
   (e) withdrawing the powdery milk product at a temperature below 28° C., said milk product having a moisture content between 2 and 3% from the end of the fluidized layer opposite the one at which said product is introduced in step (a).

10. The process of claim 3 comprising cooling of sugar.

* * * * *